United States Patent
Babudri et al.

(10) Patent No.: US 7,249,231 B2
(45) Date of Patent: Jul. 24, 2007

(54) SEMICONDUCTOR MEMORY WITH ACCESS PROTECTION SCHEME

(75) Inventors: Irene Babudri, Burago di Molgora (IT); Stefano Ghezzi, Treviolo (IT); Giuseppe Giannini, Milan (IT); Ruggero DeLuca, Fregona (IT)

(73) Assignee: STMicroelectronics S.r.l. (IT)

( * ) Notice: Subject to any disclaimer, the term of this patent is extended or adjusted under 35 U.S.C. 154(b) by 335 days.

(21) Appl. No.: 10/781,974

(22) Filed: Feb. 18, 2004

(65) Prior Publication Data

US 2004/0205314 A1    Oct. 14, 2004

(30) Foreign Application Priority Data

Feb. 18, 2003    (EP)    ................... 03425093

(51) Int. Cl.
*G06F 12/00*    (2006.01)
(52) U.S. Cl. ..................... 711/156; 711/103
(58) Field of Classification Search ................ 711/156, 711/103
See application file for complete search history.

(56) References Cited

U.S. PATENT DOCUMENTS 5,930,826 A    7/1999    Lee et al.

FOREIGN PATENT DOCUMENTS

EP    0 437 386 A1    7/1991

*Primary Examiner*—Brian R. Peugh
(74) *Attorney, Agent, or Firm*—Graybeal Jackson Haley LLP

(57) ABSTRACT

A memory, particularly but not limitatively a flash memory, comprises at least one data storage area comprising a plurality of data storage locations, and an access circuitry for accessing the data storage locations for either retrieving or altering a data content thereof, depending for example on a memory user request. The memory includes at least one first user-configurable flag element and a second user-configurable flag element. Both the at least one first and the second flag elements are used by a user to set a protected state of the respective data storage area against alteration of the content of the data storage locations thereof. The protected state defined by setting the first flag element is user-removable, i.e., it can be removed by request from the user, so as to enable again the alteration of the content of the data storage area. On the contrary, the protected state defined by setting the second flag element is permanent and, once set, it cannot be removed: the data storage area becomes unalterable.

7 Claims, 6 Drawing Sheets

SEMICONDUCTOR MEMORY WITH ACCESS PROTECTION SCHEME

PRIORITY CLAIM

This application claims priority from European patent application No. 03425093.6, filed Feb. 18, 2003, which is incorporated herein by reference.

TECHNICAL FIELD

The present invention relates generally to the field of integrated circuits, and more specifically to semiconductor memories.

BACKGROUND

In the field of semiconductor memories, flash memories have become rather popular, because they combine the capability of storing relatively large amounts of data with the possibility of modifying their content directly in the field.

Flash memories are, for example, used to store the code to be executed by data processing units (e.g., microcontrollers, microprocessors, coprocessors, digital signal processors and the like) in a variety of electronic apparatuses, such as personal computers, mobile phones, set-top boxes for cable or satellite television, videogame consoles, just to mention some.

In particular, by using flash memories, it is possible to modify the stored code without having to remove the memory component from the respective socket. It has thus become possible to, e.g., change the code, fix code bugs, update the code version directly at the premises of the users; the new code can be, for example, downloaded over the internet, or received directly by a mobile phone from the service provider company.

There are applications in which these possibilities offered by flash memories raise problems of security. Electronic piracy acts may for example cause the code stored in the memory to be corrupted.

A family of flash memories produced by Intel® include a 128-bit One-Time Programmable (OTP) protection register that can be used to increase the security of a system design by allowing tracking and fraud protection. For example, the number contained in the protection register can be used to match the Flash memory component with other components of an electronic system, such as the CPU or an ASIC, preventing device substitution. The 128 bits of the OTP protection register are divided into two 64-bit segments. One of these segments is programmed at the factory with a unique 64-bit number, which cannot be changed. The other segment is left blank for customer designers to program as desired. Once the customer segment is programmed, it can be locked by programming bits in a lock word part of the OTP register, so as to prevent reprogramming of the customer-reserved 64-bit segment. This lock cannot be reversed by the customer.

The OTP protection register does not however allow avoiding fraudulent or generally unwanted alteration of the content of the memory storage area, where the program code and/or data are stored.

Therefore, there is the need of devising some scheme of protection of the memory content against fraudulent changes or even simply unwanted corruption.

SUMMARY

According to an embodiment of the present invention, a memory comprises at least one data storage area comprising a plurality of data storage locations. Access circuitry is provided for accessing the data storage locations for either retrieving or altering a data content thereof, depending for example on a memory user request.

The memory includes at least one first user-configurable flag element and a second user-configurable flag element associated with the at least one data storage area. Both the at least one first and the second flag elements are used by a memory user to set a protected state of the at least one data storage area against alteration of the content of the data storage locations thereof. The protected state defined by setting the at least one first flag element is user-removable, i.e., it can be removed by request from the user, so as to enable again the alteration of the content of the data storage area. On the contrary, the protected state defined by setting the second flag element is permanent and, once set, it cannot be removed: the data storage area becomes unalterable.

DESCRIPTION OF DRAWINGS

Features and advantages of the present invention will be made apparent by the following detailed description of some embodiments thereof, provided merely by way of non-limitative examples, description that will be made in connection with the annexed drawing sheets, wherein.

DETAILED DESCRIPTION

Figure 1:
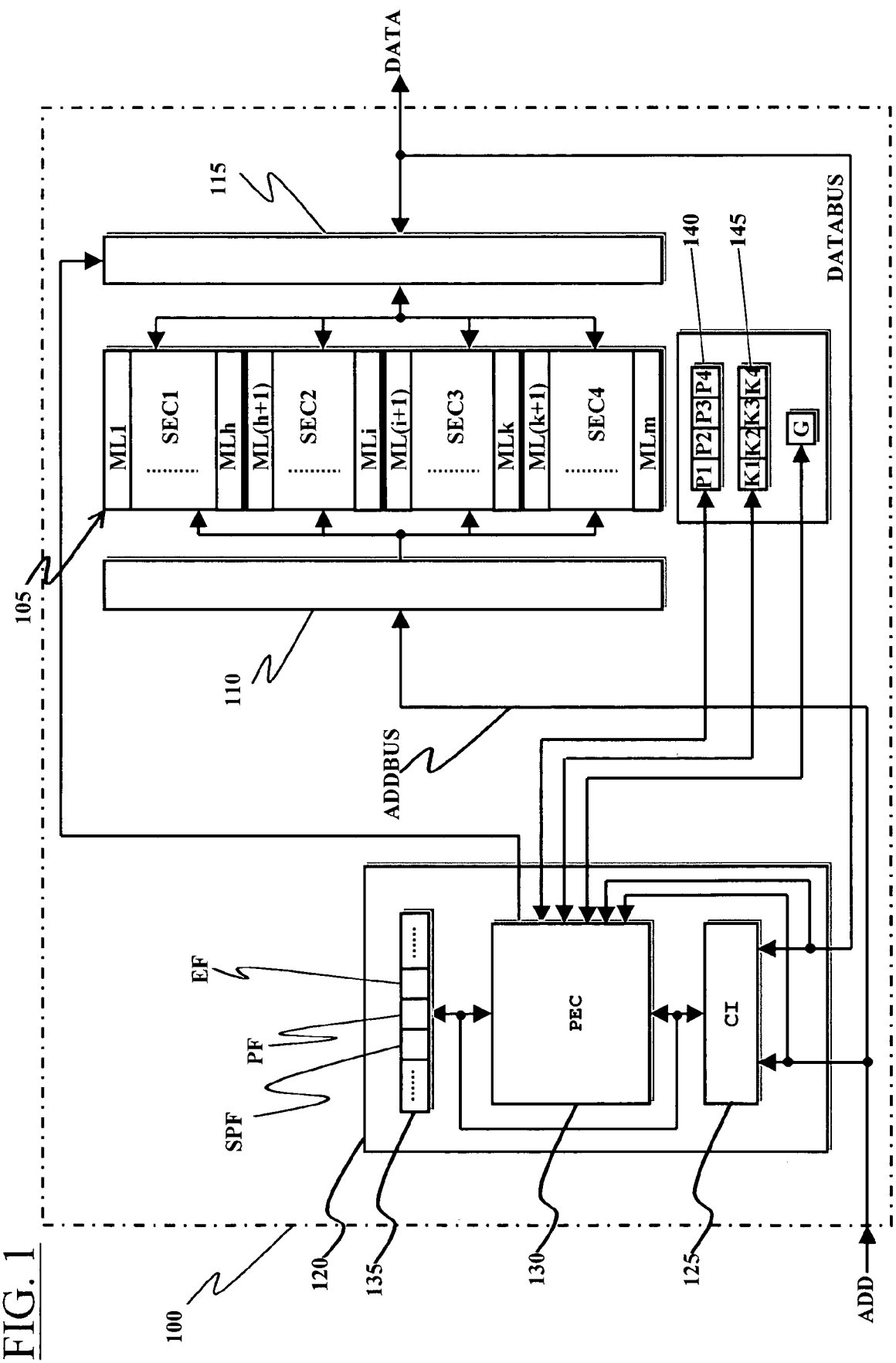
FIG. 1 is a schematic view, in terms of the relevant functional blocks, of a memory according to an embodiment of the present invention.

With reference to the drawings, a semiconductor memory, particularly but not limitatively a flash memory, globally indicated as 100 in FIG. 1, comprises a data storage area 105 with a plurality of memory locations ML1 to MLm, e.g., eight or sixteen bits wide, for storing data, code, etc. According to an embodiment of the invention, the memory storage area 105 is segmented into a plurality of memory sectors, e.g., four memory sectors SEC1, SEC2, SEC3, SEC4; each memory sector includes a respective subset ML1 to MLh, ML(h+1) to MLi, ML(i+1) to MLk and ML(k+1) to MLm of the memory locations ML1 to MLm of the memory storage area 105. The different memory sectors SEC1 to SEC4 may include a same number or different numbers of memory locations. In the exemplary case that the memory 100 is a flash memory, the memory sectors SEC1 to SEC4 are the portions of the storage area 105 that can be individually erased.

Also schematically shown in FIG. 1 are a memory location selection circuitry 110 and a memory location read/write/erase circuitry 115. The memory location selection circuitry 110 allows selecting the desired memory locations, within the set of memory locations ML1 to MLm, on the basis of an address supplied to address input terminals ADD of the memory 100 and distributed within the memory by a memory address bus ADDBUS; the memory location selection circuitry typically comprises decoders and multiplexers/demultiplexers.

The memory location read/write/erase circuitry 115 is intended to include all the circuits for reading data from the selected memory locations, all the circuits for writing data into the selected memory locations, and all the circuits for erasing the selected memory locations. A memory data bus DATABUS carries to/from data input/output terminals DATA of the memory the data read from, or to be written into the selected memory locations.

Figure 2:
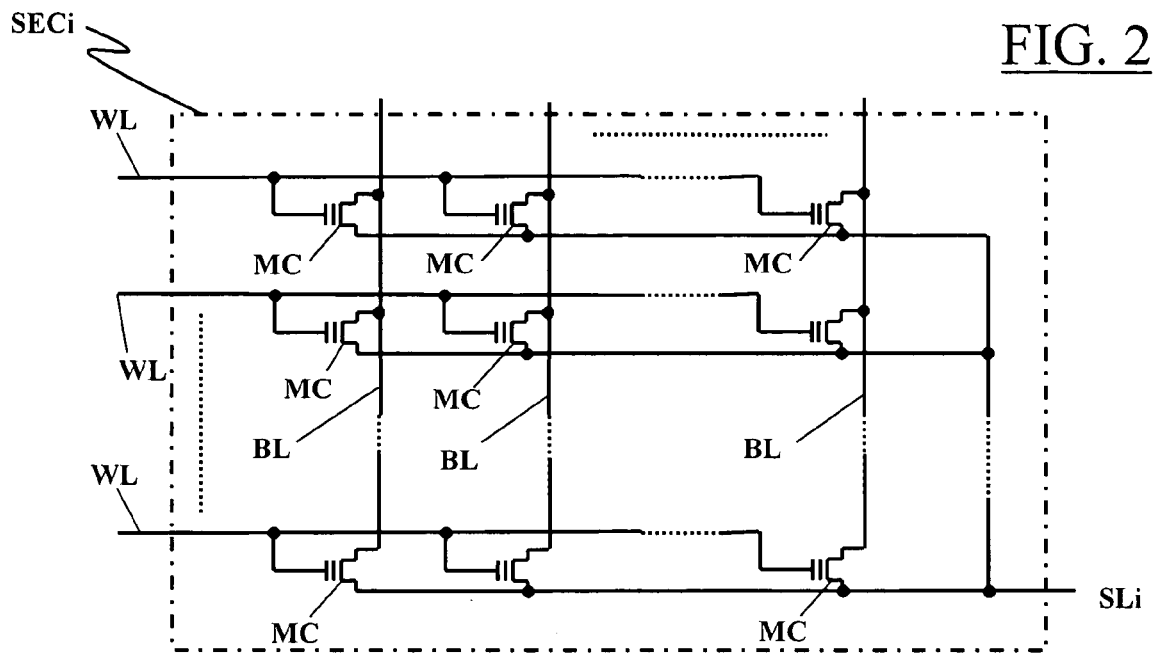
FIG. 2 shows in greater detail a generic memory sector of the memory of FIG. 1 according to an embodiment of the invention.

FIG. 2 shows in greater detail the structure of a generic memory sector SECi of the memory sectors SEC1-SEC4, in an embodiment of the present invention. Memory cells MC, for example stacked-gate MOS transistors, are arranged in two-dimensional array with a plurality of rows or word lines WL and a plurality of columns or bit lines BL. Each memory cell MC has a control-gate electrode connected to a respective word line, and a drain electrode connected to a respective bit line. Source electrodes of all the memory cells MC of the memory sector SECi are connected to a common source line SLi. Different memory sectors have different source lines, thus allowing selective erasing of the memory sectors. A memory location is typically formed of eight or sixteen memory cells MC on a same word line WL; the memory location is selected by selecting, on the basis of the address fed to the memory, the word line and the eight or sixteen bit lines BL to which the memory cells belong. The memory cells of the selected memory location can be accessed to read the data content thereof, by connecting the selected bit lines to a sensing circuitry, or they can be programmed according to data supplied to the memory, by connecting the selected bit lines to a program load circuitry. In order to erase the data content of a generic memory location in the memory sector, the whole sector has to be erased.

According to an embodiment of the present invention, the different memory sectors SEC1-SEC4 can be selectively protected to prevent any alteration of the content of the respective storage locations.

In particular, in an embodiment of the present invention, selective protection of the memory sectors SEC1-SEC4 against the alteration of the content thereof is achieved by means of user-configurable flag elements, allowing a memory user to specify whether one or more of the memory sectors is protected against alteration of the content thereof; when a given memory sector is protected, any operation involving the alteration of the content of the respective memory locations is considered forbidden and thus is not carried out.

In a preferred embodiment of the present invention, a multi-level, e.g., a two-level, protection scheme is implemented. A first group 140 (shown, e.g., in FIG. 1) of flag elements (in the following shortly referred to as protection flags) includes one protection flag P1-P4 for each of the memory sectors SEC1-SEC4; any one of the protection flags P1-P4 can be set by the user to specify that the associated memory sector SEC1-SEC4 is protected. The protection flags P1-P4 can also be reset by the user, to remove the protection from one or more memory sectors when the user wants to change the data content thereof. The possibility of resetting a given protection flag P1-P4, i.e., of removing the protection of the associated memory sector SEC1-SEC4, is however made dependent, i.e., conditioned, on the state of an associated additional flag element K1-K4, hereinafter referred to as lock flag, part of a group 145 of lock flags: if a given lock flag K1-K4 is set, resetting of the associated protection flag, and thus removal of the protection of the associated memory sector, is inhibited.

As is the case with protection flags P1-P4, also the lock flags K1-K4 are user-configurable; in a preferred embodiment of the present invention, any lock flag can be set only if the associated protection flag has preliminarily been set; once a lock flag has been set, it cannot be reset, so that the associated memory sector remains permanently protected, because the associated protection flag cannot be reset anymore.

Any memory sector can thus be in one of three different states: unprotected, protected, and locked. When a memory sector is unprotected, the storage locations thereof can be freely accessed in read and write. When the memory sector is protected, but not locked, the storage locations thereof can be accessed in read, but not in write; however, this condition is not permanent: the memory sector can still be unprotected, so as to allow again accessing the storage locations thereof also in write mode. When a memory sector is protected and locked, the storage locations thereof can be accessed in read only, and this condition is permanent, since the memory sector cannot be unprotected.

In an alternative embodiment, even if the associated protection flag is not set, any given lock flag can be set by the user and, once set, cannot be reset anymore; in this case, the protection flags are used as temporary protection indicators, while the lock flags are used as permanent protection indicators. Also in this case, any memory sector can be in three different states: unprotected, protected and locked.

Figure 3:
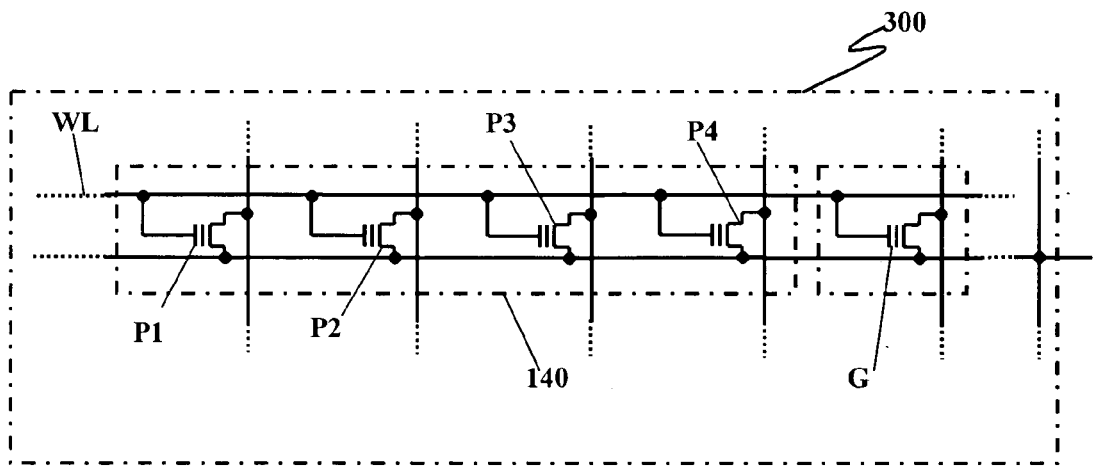
FIG. 3 shows in greater detail a storage area of the memory of FIG. 1 used to store memory sector protection flags and memory sector lock flags according to an embodiment of the invention.
Figure 3:
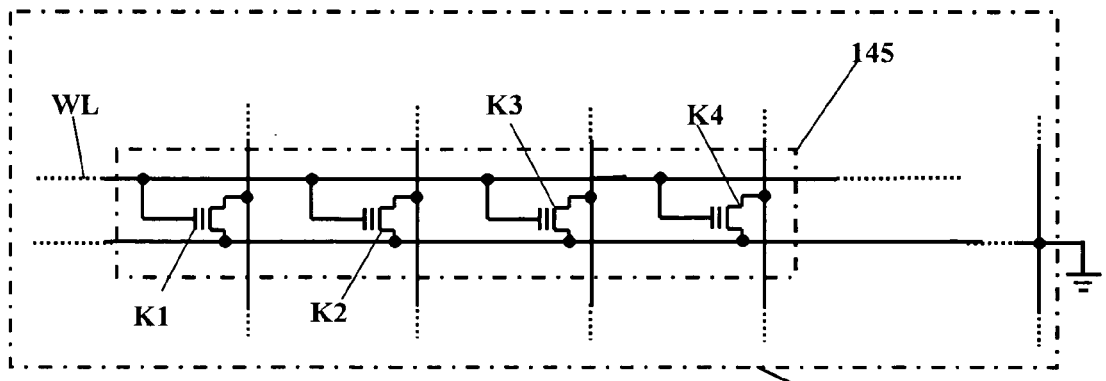

In a preferred embodiment of the present invention, the protection flags and the lock flags are non-volatile flag elements; this allows retaining the protection and locking information concerning the memory sectors even in absence of the power supply. FIG. 3 shows in greater detail the structure of the protection flags 140 and of the lock flags 145, in an embodiment of the present invention. In the memory 100, 20 two storage areas 300 and 305 distinct from the data storage area 105 are provided for. The two storage areas 300 and 305 may have the same general structure of the memory sectors SEC1-SEC4, with a plurality of stacked-gate memory cells MC arranged in a two-dimensional array with word lines and bit lines. The protection flags P1-P4 are formed by four memory cells MC in the storage area 300, and the lock flags K1-K4 are formed by four memory cells in the storage area 305. The storage area 300 is erasable and programmable, while the storage area 305 is a one-time programmable (OTP) storage area.

One or both of the storage areas 300 and 305 can be storage areas already present in the memory 100 for different purposes; for example, the storage area 300 can be the same storage area where the Common Flash Interface (CFI) table is stored (a table containing information on the flash memory). Free memory cells in these already existing storage areas can thus be exploited to act as protection flags or lock flags. Clearly, the memory cells acting as protection flags P1-P4, being erasable and programmable, shall be in a storage area that does not contain information not to be erased. Also shown in FIGS. 1 and 3 is an additional flag element G (guard flag), for example formed by one memory cell of the storage area 300. As will be better described later, the function of the guard flag is one of ensuring that the protection flags P1-P4 are not corrupted.

The memory 100 also comprises a memory control unit 120, controlling the operation of the memory 100. The control unit 120 includes a command interpreter (CI) 125, a program/erase controller (PEC) 130 and a status register 135. The CI 125 interprets commands or sequences of commands received by the memory 100, and determines the operations to be carried out by the memory for executing the received commands. The commands are received in the form of data and addresses at the memory terminals ADD and DATA, and are delivered to the control unit 120 by the buses DATABUS and ADDBUS. In particular, a command includes a command code, that the CI 125 decodes to identify the type of command. The CI 125 is, for example, implemented by means of a state machine. Examples of commands are: read a specified memory location or group of memory locations, write a specified memory location or group of memory locations, erase a specified memory sector or group of memory sectors; set a memory sector as protected; set a memory sector as locked; remove protection from a memory sector.

The PEC 130 is activated by the CI 125 when the execution of the received command includes operations involving an alteration of the memory content; examples of these commands are: write a specified memory location or group of memory locations, erase a specified memory sector or group of memory sectors; set a memory sector as protected; set a memory sector as locked; remove protection from a memory sector. In these cases, the PEC 130 takes control of the memory operation in order to execute the specific command. The PEC is for example implemented by means of a microcontroller, embedded in the memory 100, for executing a microcode stored in a dedicated ROM (not shown in the drawings).

The status register 135 provides an indication of the status of the memory 100; for example, the status register 135 has status bits that can be set to indicate that a certain operation is being executed, or to indicate the successful/unsuccessful result of a given operation. In particular, the status register 135 includes status bits PF (program fail), EF (erase fail) and SPF (sector protection fail); as will be described in detail below, the program fail status bit PF and the erase fail status bit (EF) are set each time a program operation or, respectively, an erase operation are unsuccessful; the sector protection fail status bit SPF is set each time the execution of an operation would have required a violation of the memory sector protection (the operation not being in this case executed).

The content of the status register 135 can be read from outside the memory, by providing to the control unit 120 a particular command or sequence of commands; in this way, devices external to the memory 100 can for example ascertain if the memory 100 is busy, the state of execution of a requested operation, and the successful/unsuccessful result of a requested operation.

Figure 4A:
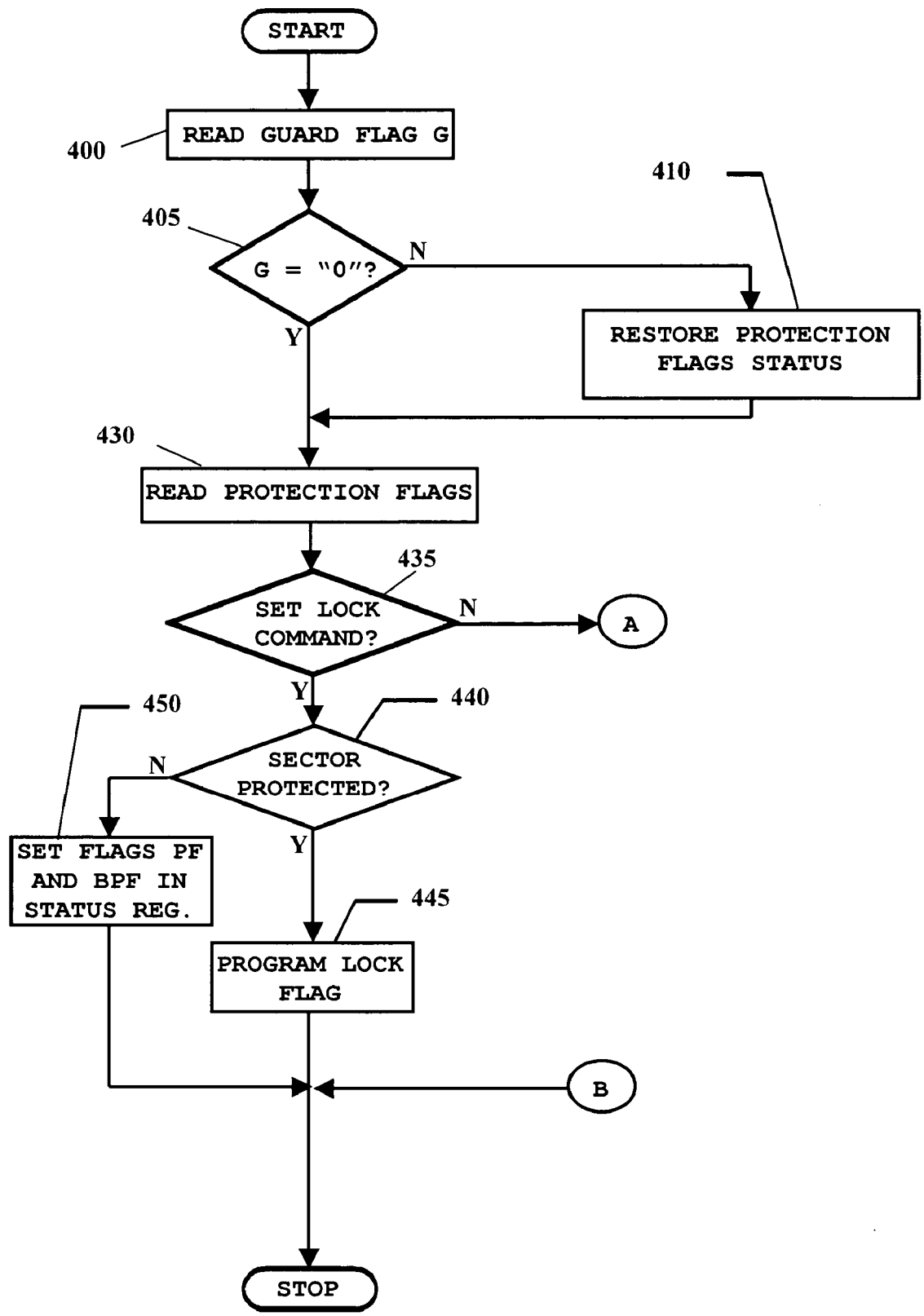
FIGS. 4A, 4B and 4C are simplified flowcharts schematically showing the operation of a program/erase controller unit of the memory of FIG. 1, in an embodiment of the present invention.
Figure 4B:
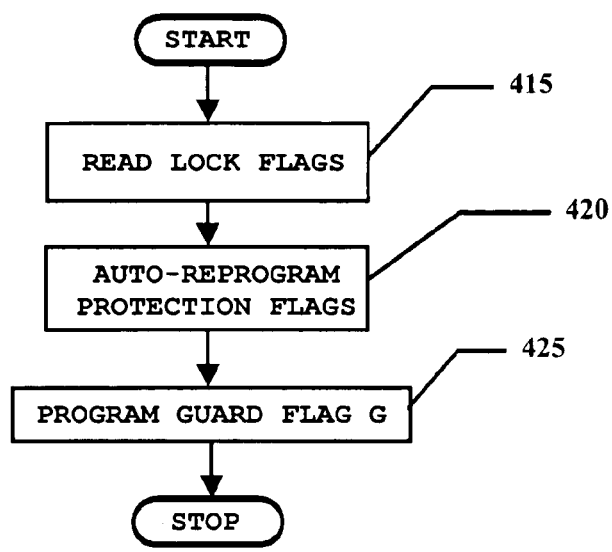
Figure 4C:
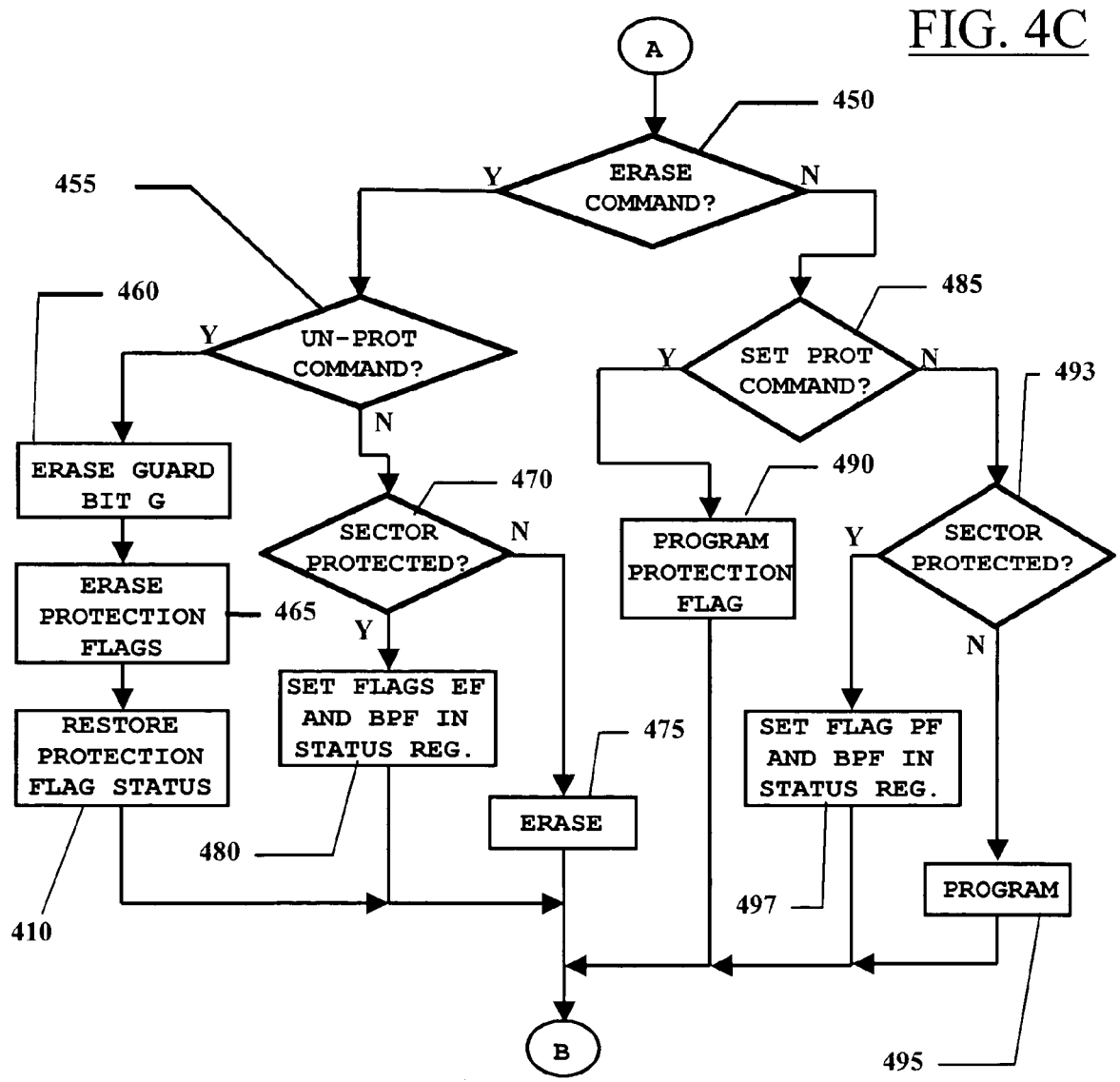

FIGS. 4A, 4B and 4C schematically show, in terms of flowcharts, the operation of the PEC 130. Whenever one of the commands or sequences of commands involving the alteration (write or erase) of the data stored in any memory sector SEC1-SEC4 or in any other storage area of the memory 100, such as the storage areas 300 and 305, is issued to the memory, the CI 125 invokes the PEC 130. The PEC 130 takes control of the memory operation.

Each time the PEC 130 is invoked, before performing any action causing the alteration of data, the PEC 130 firstly checks the status of the guard flag G, so as to ascertain the coherence of the memory sector protection information stored in storage area 300. The storage area 300 is accessed, and the datum stored in the guard flag G is read (block 400).

If the guard flag G is not found to be in a prescribed status, e.g., the programmed status, conventionally corresponding to a logic "0" (decision block 405, exit branch N), the status of the memory sector protection flags P1-P4 is declared to be potentially corrupted; the PEC 130 then calls a routine (block 410) directed to restore a more reliable memory sector protection flag status. In particular, the status of the memory sector protection flags P1-P4 is restored so as to be coherent with the status of the corresponding memory sector lock flags K1-K4. As shown in the flowchart of FIG. 4B, the storage area 305 is accessed, and the data stored in the lock flags K1-K4 is read (block 415). The PEC 130 then starts a program operation of the memory cells in the storage area 300 that correspond to the protection flags P1-P4, so as to write thereinto the pattern read from the bits, in the storage area 305, corresponding to the memory sector lock flags K1-K4 (block 420); when the program operation of the memory sector protection flags P1-P4 is successfully completed, the PEC 130 starts a program operation directed to programming the guard flag G to the prescribed value (block 425); once programmed, the guard flag G ensures that the status of the protection flags P1-P4 has not been corrupted.

After having restored the status of memory sector protection flags, or in case the guard flag G is ascertained to be in the prescribed status (decision block 405, exit branch Y) the PEC 130 loads the status of the protection flags P1-P4, stored in the corresponding memory cells of the storage area 300; the current memory sector protection configuration is temporarily stored in the PEC 130 (block 430).

The PEC 130 then ascertains whether the command issued to the memory is a command (SET LOCK <SECi> command) directed to setting as locked a generic memory sector SECi of the memory sectors SEC1-SEC4 (decision block 435).

In the affirmative case (decision block 435, exit branch Y) the PEC 130, based on the memory sector protection configuration previously retrieved from the memory sector protection flags in the storage area 300, ascertains whether the memory sector SECi that should be put in the locked status is already configured as protected, i.e., if the corresponding protection flag Pi is set (decision block 440). If the memory sector SECi to be locked is already configured as protected (decision block 440, exit branch Y), the setting of the memory sector in the locked status is admissible, and the PEC 130 starts a program operation directed to programming, in the storage area 305, the memory cell corresponding to the lock flag Ki that is associated with the memory sector SECi to be locked (block 445). When the program operation is completed successfully, the PEC 130 releases the control of the memory operation. If, for any reason, the program operation of the lock flag Ki cannot be completed successfully, before releasing the control of the memory operation the PEC 130 sets the program fail flag PF in the status register 135.

If, on the contrary, the PEC 130 recognizes that the memory sector SECi to be locked is not yet protected (decision block 440, exit branch N), the locking of the memory sector is not admissible. Before releasing the control of the memory operation, the PEC 130 sets the status register flags SPF and PF (block 450), thereby indicating that the locking of the memory sector SECi cannot be carried out due to the fact that the memory sector SECi is not protected.

If the command issued to the memory is not a SET LOCK <SECi> command (decision block 435, exit branch N), then, referring to FIG. 4C, the PEC 130 checks whether the command issued to the memory is an erase command (decision block 451); an erase command is either a command issued to the memory for erasing a generic one of the memory sectors SEC1-SEC4, or an un-protection (UN-PROT) command issued to the memory for un-protecting the memory sectors SEC1-SEC4. If the PEC 130 detects that the command is an erase command (decision block 451, exit branch Y), the PEC checks whether the command is an UN-PROT command (decision block 455). In the affirmative case (decision block 455, exit branch Y) the PEC 130 erases the guard flag G (block 460), and then starts an erase operation of the storage area 300 containing the memory sector protection flags P1-P4 (block 465); if, as in the present example, the guard flag is a memory cell of the storage area 300, the actions of the two blocks 460 and 465 may be carried out simultaneously. After the erase operation, all the memory sector protection flags are erased. The PEC 130 then calls the routine 410 for restoring the protected status in respect of those memory sectors that are in a locked status. In this way, only those memory sectors that are not in a locked status are actually un-protected, while the un-protect command does not alter the protected status of the memory sectors that are locked, which remain protected. The PEC 130 then releases the control of the memory operation.

If the command is not an UN-PROT command (decision block 455, exit branch N), the PEC 130 checks whether the memory sector to be erased is protected (decision block 470); the sector to be erased is for example the addressed memory sector, specified in the address supplied to the memory 100. If the memory sector to be erased is not protected (decision block 470, exit branch N), the PEC 130 starts an erase operation of the addressed memory sector (block 475) and, upon completion of the erase operation, the PEC 130 releases the control of the memory operation. If, on the contrary, the memory sector to be erased is protected (decision block 470, exit branch Y), no erase operation is performed; before releasing the control of the memory operation, the PEC 130 sets the flags EF and SPF in the status register (block 480).

Going back to the decision block 451, let it be assumed that the PEC 130 ascertains that the command issued to the memory is not an erase command (decision block 451, exit branch N); the issued command is thus either a program command of one or more memory locations in a generic one of the memory sectors SEC1-SEC4, or a command (SET PROT <SECi> command) directed to setting the protected status of a generic memory sector SECi of the memory sectors SEC1-SEC4. The PEC 130 ascertains whether the issued command is a SET PROT <SECi> command (decision block 485). In the affirmative case (decision block 485, exit branch Y), the PEC 130 starts a program operation for programming the protection flag Pi associated with the addressed memory sector (block 490); for example, the memory cell in the storage area 300 to be programmed for setting the protection of the memory sector is determined by decoding the memory sector address. After successful completion of the program operation, the PEC 130 releases the control of the memory operation. If instead the command is not a SET PROT <SECi> command (decision block 485, exit branch N), the PEC 130 ascertains whether the addressed memory sector is protected (decision block 493). In the negative case (decision block 493, exit branch N) the PEC 130 starts a program operation directed to programming the desired memory location or locations in the addressed memory sector (block 495). If instead the addressed memory sector to be programmed is protected (decision block 493, exit branch Y), the program operation is not admissible and, before releasing the control of the memory operation, the PEC 130 sets the flags PF and SPF in the status register (block 497).

Figure 5:
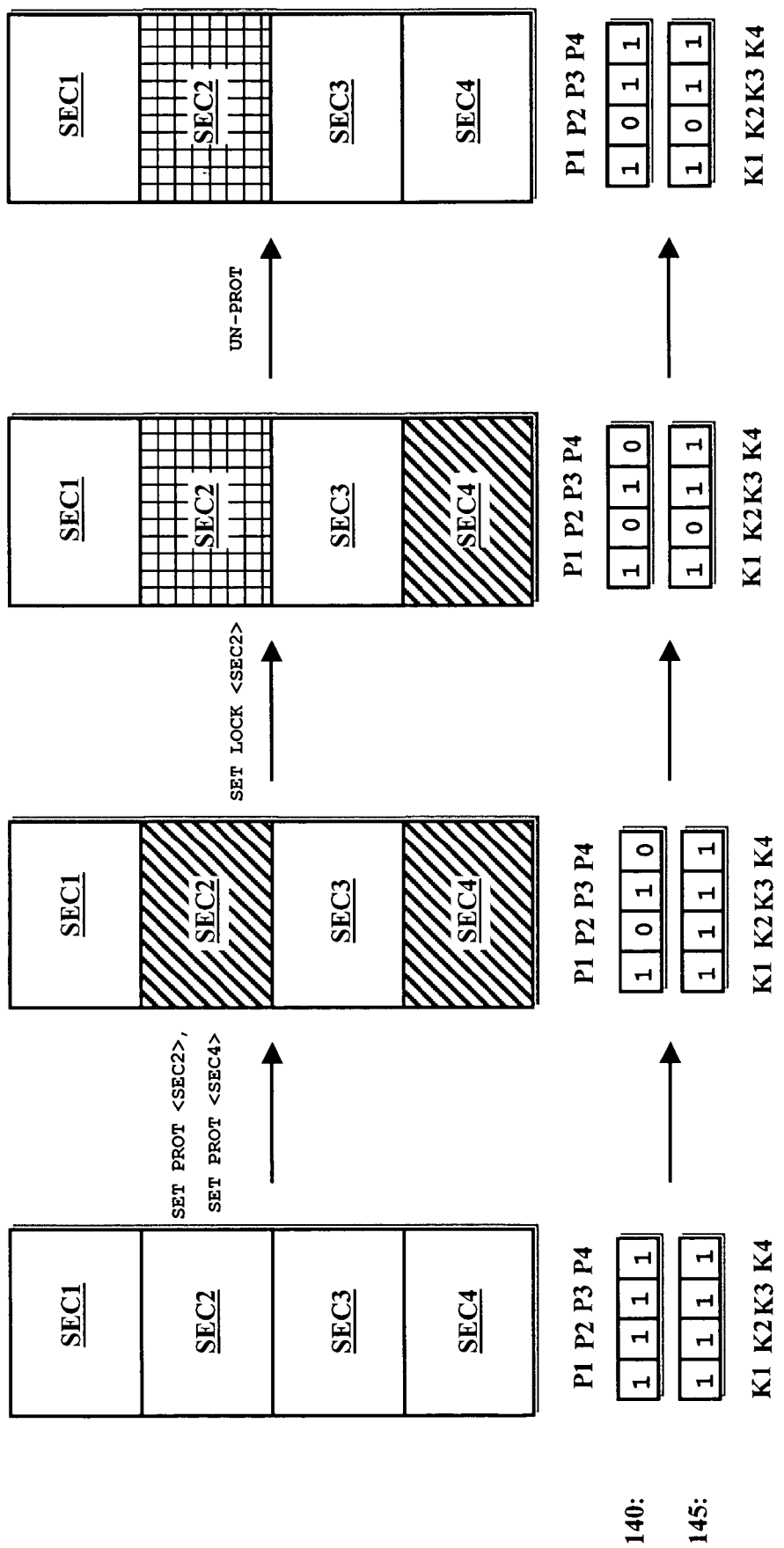
FIG. 5 schematically shows an example of the evolution through different protection states of the memory sectors according to an embodiment of the invention.

FIG. 5 pictorially shows the evolution of the state of the memory sectors SEC1-SEC4, of the protection flags P1-P4 and of the lock flags K1-K4, in an example of memory sector protect, memory sector lock and memory sector un-protect sequence of commands. It is assumed that all the memory sectors SEC1-SEC4 are initially un-protected (all the protection flags P1-P4 and all the lock flags K1-K4 are equal to "1"). Then, commands SET PROT <SEC2> and <SET PROT SEC4> are received, causing the memory sectors SEC2 and SEC4 to be put in the protected state: the protection flags P2 and P4 are set to "0". A command SET LOCK <SEC2> is then received, causing the memory sector SEC2 to be put in the locked state. Finally, an UN-PROT command is received, for removing the protection set for the memory sectors; the memory sector SEC4 is un-protected (flag P4 cleared to "1"), while the locked memory sector SEC2 remains protected.

It is observed that albeit in the foregoing it has been assumed that a SET PROT <SECi> command enables setting the protection of one memory sector only, nothing prevents devising a command for the memory directed to setting the protection of one or more memory sectors, as specified in the command.

In the exemplary embodiment described herein, the protection flags P1-P4 are implemented by means of memory cells belonging to a same storage area 300 that has been assumed to be erasable in bulk (just like any memory sector SEC1-SEC4); in this way, it is not possible to individually un-protect a given memory sector. Alternative solutions may be adopted allowing a higher selectivity in terms of un-protection of the memory sectors. For example, nothing prevents implementing the protection flags by means of memory cells belonging to individually erasable storage areas, so as to render the un-protect operation selective by memory sector. Another way to achieve the same result is by exploiting an architecture for the storage area 300 of the type enabling a selective erasure by word lines or, even, by portions of word line: in this case, selective un-protection of the memory sectors can be achieved by implementing the respective protection flags by means of memory cells belonging to different word lines of the storage area 300, or to different individually erasable portions of a same word line. Similar results in terms of selectivity of the un-protection operation can also be achieved by properly modifying the algorithm implemented by the PEC: for example, upon receipt of a command of un-protection of a given memory sector, the PEC might erase globally the storage area 300, and then re-program the memory cells corresponding to the memory sectors not to be un-protected.

As already mentioned in the foregoing, an alternative embodiment of the present invention may provide that the setting of a memory sector in the locked status does not depend on a previous setting of the memory sector in the protected status. A generic memory sector can be set as locked irrespective of the fact that the memory sector is protected or not.

Figure 6:
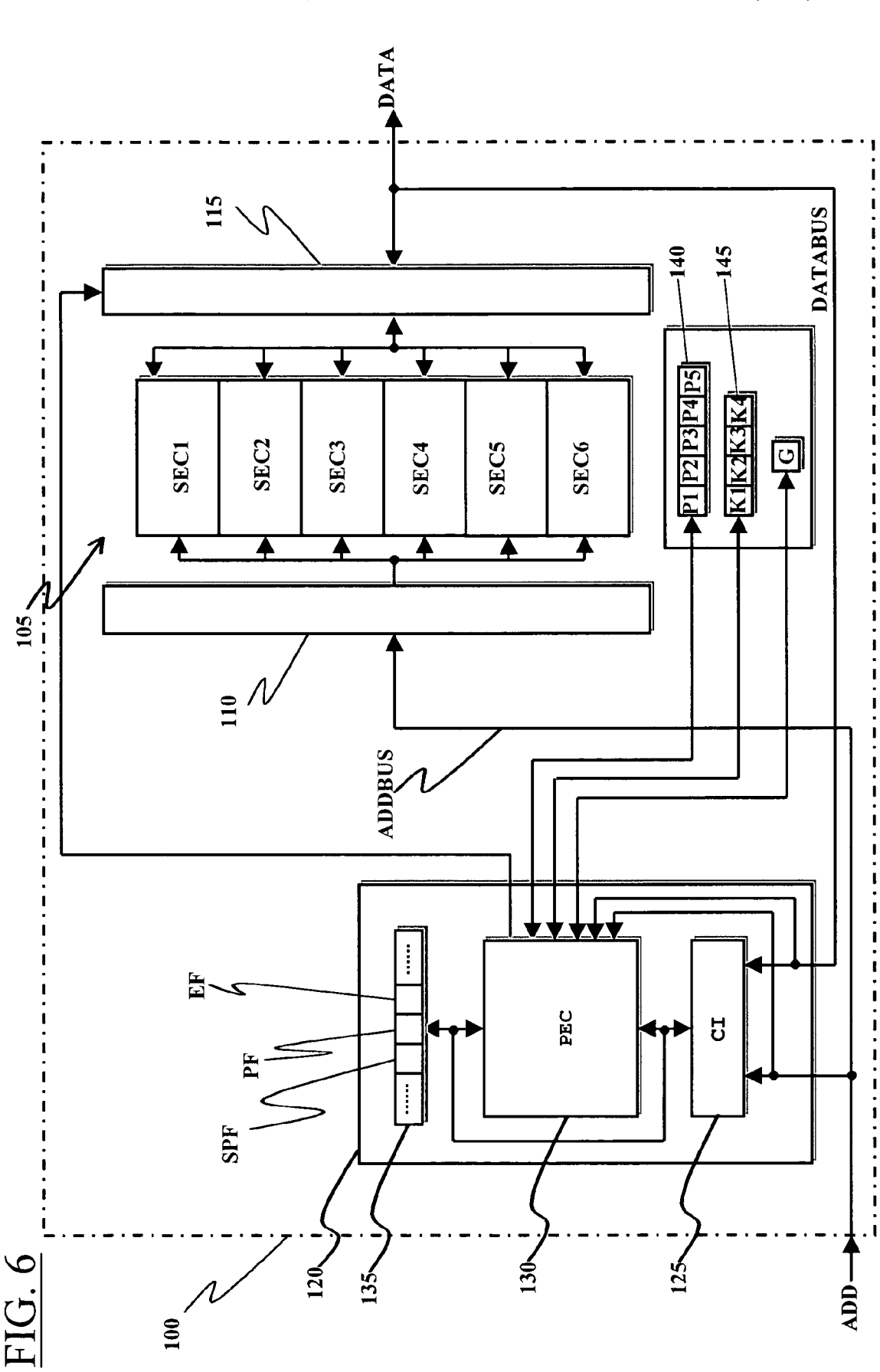
FIG. 6 is a schematic view of a memory according to an alternative embodiment of the present invention.

It is observed that it is possible to subject to the protection scheme only some of the sectors making up the memory and, among these memory sectors, some memory sectors can be protected and locked, while some other memory sector can only be protected, but not locked. For example, with reference to FIG. 6, a memory similar to that shown in FIG. 1 is shown, including six memory sectors SEC1-SEC6 instead of four; of these six memory sectors SEC1-SEC6, the four memory sectors SEC1-SEC4 can be protected and locked, setting the protection flags P1-P4 and the lock flags K1-K4; the memory sector SEC5 can only be temporarily protected, setting a respective protection flag P5, but cannot be locked in the protected state; the memory sector SEC6 cannot be protected nor, a fortiori, locked.

If desired, in order to increase the overall security, the execution of a memory sector protection, un-protection, and/or lock operation can be made dependent on a password mechanism, based on a password stored in the memory 100. In such a case, in order to protect, un-protect and/or lock the memory sectors, the user shall provide to the memory 100, together with the respective command, an identification password; the control unit 120, for example the CI or the PEC, will verify that the identification password coincides with the stored password, enabling the execution of the operation only in the affirmative case. Alternatively, or in addition to the password mechanism, a hardware key mechanism can be implemented, based for example on the application of suitable voltage levels, preferably different from those employed in the normal operation of the memory, to prescribed pins of the memory.

The protection scheme described herein increases security, because parts or all of the storage area can be protected against altering of the data content.

The levels of the protection scheme may be more than two; in particular, more than one level of user-removable protection can be implemented by providing more protection flags.

The protection scheme, albeit particularly useful in connection with Flash memories, can be applied in general to any kind of memory.

As suggested elsewhere herein, the memory 100 is typically part of an electronic system, such as a computer system.

Although the present invention has been disclosed and described by way of some embodiments, it is apparent to those skilled in the art that several modifications to the described embodiments, as well as other embodiments of the present invention are possible without departing from the scope thereof.

What is claimed is:

1. A memory comprising:
    at least one data storage area comprising a plurality of data storage locations;
    an access circuitry for accessing the data storage locations for retrieving or altering a data content thereof; and
    at least one first user-configurable flag element and a second user-configurable flag element associated with said storage area, the first and second flag elements being used to define a protected state of the data storage area against alteration of the content of the data storage locations thereof, the protected state defined by the at least one first flag element being user-removable, while the protected state defined by the second flag element being permanent and non-removable,
    in which the at least one first flag element has a first state and a second state, in which any alteration of the data content of the respective data storage area is allowed and, respectively, inhibited, and
    the second flag element has a first state and a second state, in which changing of the state of the second flag element from the second state to the first state is allowed and, respectively, inhibited, so that when the second flag element is in the second state the respective data storage area is permanently protected against alteration of the data content thereof.

2. The memory of claim 1, in which said second flag element can be set to define the permanent protected state of the respective data storage area irrespective of the fact that the at least one first flag element is set to define the removable protected state.

3. The memory of claim 1, in which the at least one first flag element comprises a non-volatile programmable and erasable storage element, and the second flag element comprises a one-time programmable non-volatile storage element.

4. The memory of claim 1, in which the second flag element can be set into the second state only if the at least one first flag element is in the second state.

5. The memory of claim 1, in which said at least one storage area comprises at least two storage areas, and in which for each of said at least two storage areas a respective first and second user-configurable flag elements are provided.

6. The memory of claim 1, comprising at least one further data storage area comprising a plurality of storage locations, and user-configurable flag means associated with said at least one further data storage area adapted to define a protected state of the at least one further data storage area against the alteration of the content of the respective storage locations, said protected state being removable by the user and not permanent.

7. The memory of claim 1, comprising means for conditioning the configuring of said first and second flag elements by the user on the recognition of the user by the memory.

* * * * *